A. GRÜNENWALD.
SUCKLING ARRANGEMENT FOR PIGS.
APPLICATION FILED SEPT. 16, 1907.

No. 898,878. Patented Sept. 15, 1908.

Witnesses:
William Fielding
Willi Schröter

Inventor:
August Grünenwald
By his Attorneys
Alexander Powell

UNITED STATES PATENT OFFICE.

AUGUST GRÜNENWALD, OF HOHENTWIEL, GERMANY.

SUCKLING ARRANGEMENT FOR PIGS.

No. 898,878.     Specification of Letters Patent.     Patented Sept. 15, 1908.

Application filed September 16, 1907. Serial No. 392,991.

*To all whom it may concern:*

Be it known that I, AUGUST GRÜNENWALD, a subject of the Kingdom of Würtemberg, residing at Hohentwiel, in the Kingdom of Würtemberg and Empire of Germany, have invented certain new and useful Improvements in Suckling Arrangements for Pigs, of which the following is a specification.

In raising domestic animals, particularly pigs, it is frequently necessary to feed the young animals by means of artificial suckling arrangements.

The present invention is an improved suckling apparatus and consists of a novel milk vessel provided with the sucking tubes contained within a casing supported horizontally and controlled by springs adapted to allow turning or rocking movements of the vessel but which will always return the vessel to initial or normal position when not being used. The sucking tubes are attached to the vessel in such a manner that the milk or liquid food can be drawn from the lowermost part of the vessel; and the tubes are so arranged that an unintended flow will not occur.

The accompanying drawings illustrate the invention, and

Figure 1:
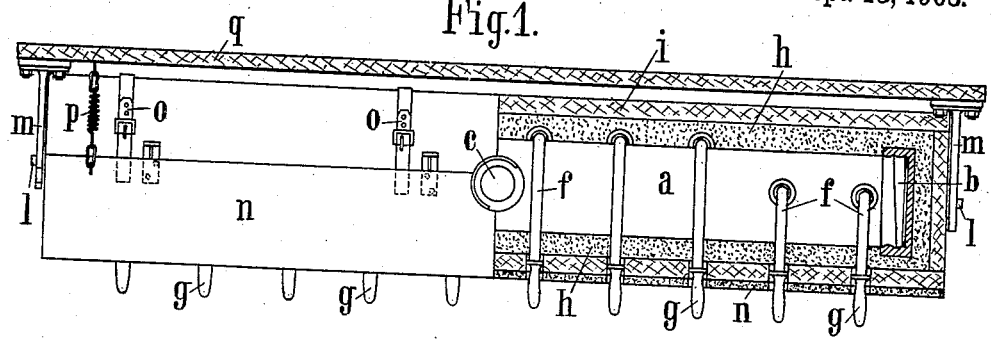
Figure 2:
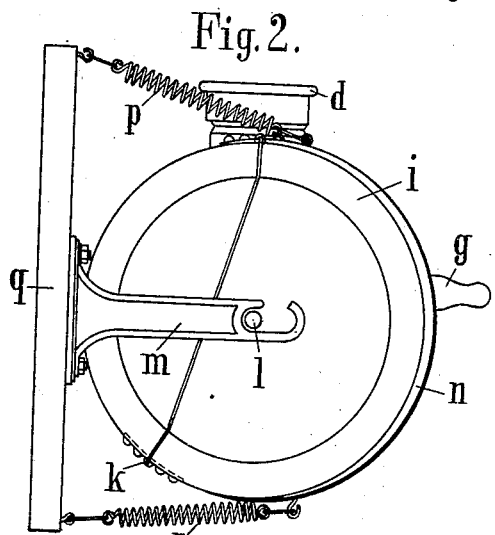
Figure 3:
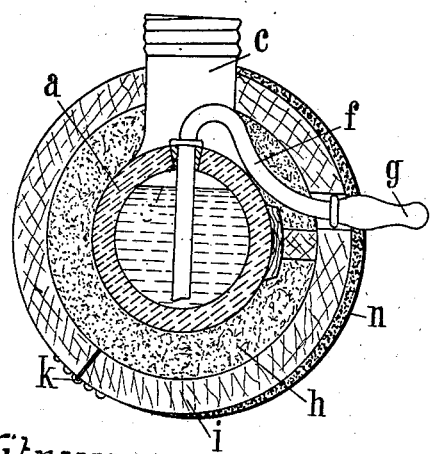
Figure 4:
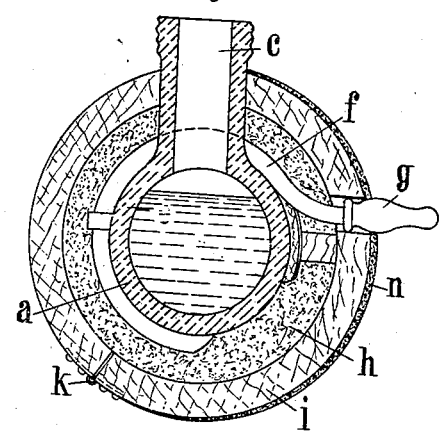

Figure 1 is a plan view of the suckling apparatus, partly in section. Fig. 2 is an end view thereof. Figs. 3 and 4 are transverse sections thereof, showing different arrangements of the sucking tubes.

The milk vessel $a$ is preferably made of acid proof material such as pottery, and is closed at both ends by screw caps $b$ and has a refilling tube $c$, which is likewise closed by a screw cap $d$. The vessel has a number of small openings to which are connected the inner ends of sucking tubes $f$ in any suitable manner, and on the outer ends of tubes $f$ are rubber nipples $g$. The sucking tubes $f$ are fitted to the milk vessel in such a manner that the milk cannot escape by gravity or siphonage through said tubes; and further when the tubes are sucked the milk is withdrawn from the lowest part of the vessel, so that the milk cannot choke the sucking animal, nor run out when no animal is sucking.

In Fig. 3 the sucking tubes are connected to the top of the vessel and extended thereinto so as to dip from above into the milk.

In Fig. 4 the tubes are connected to the lowermost part of the vessel and lead back around and over the vessel to the outlet.

The milk vessel $a$ is contained in a casing, preferably made of wood and lined with insulating or non-heat-conducting material $h$, said casing being preferably divided longitudinally into two parts hinged together as at $k$, so as to permit removal of the milk-vessel. The casing has trunnions $l$ on its ends by means of which it is supported on brackets $m$, which are so made that the casing can move slightly horizontally and also turn on its axis.

On the front side of the casing where the sucking tubes $f$ open, a light leather bolster $n$ is secured to the casing by means of leather straps $o$. This bolster prevents the animals injuring their noses and mouths when seizing the rubber nipples $g$. To the top and bottom of the casing are connected spiral springs $p$, the other ends of which are attached to the supporting board $q$. These springs normally hold the casing in the position shown in Figs. 3 and 4, but allows the sucking animal to pull the nipple forward and up and down at will, the springs $p$ always returning the casing to normal position when released.

The milking apparatus is particularly adapted for pigs; it allows the pigs to pull and push the nipples in a natural manner, and it has the further advantage that the contents of the vessel will be thoroughly mixed up when the sucking is commenced. And all parts can be readily cleansed.

Having now described my invention what I claim and desire to secure by Letters Patent of the United States is:

1. In a suckling apparatus, the combination of a pivotally mounted casing, springs for holding said casing in normal position, but permitting tilting thereof, a milk vessel in said casing, and sucking tubes connected with said vessel so as to draw milk from the bottom thereof, and extended up to the top of the casing and then down to the side thereof, and provided with nipples, substantially as described.

2. A suckling apparatus, comprising a tiltable casing having an opening for sucking tubes in its front side, supports on which the casing is mounted, springs connected to the casing and adapted to normally hold it in vertical position and to return it to normal position after displacement, a buffer on the front side of the casing, a milk vessel in said casing, sucking tubes communicating with the bottom of said vessel and extending up to the top thereof and down to the opening in the front side of the casing, and nipples on the outer ends of said tubes, substantially as described.

3. The herein described suckling apparatus, comprising a cylindric casing having an opening for the sucking tube in its front side and provided with trunnions on its ends, supports on which the trunnions are mounted, springs connected to the top and bottom of the casing and to fixed points, and adapted to return the casing to normal position after displacement, a cylindric milk vessel in said casing, and a sucking tube communicating with the bottom of said vessel and extending up over the upper side of the vessel and down to the opening in the front side of the casing.

In testimony whereof I have hereunto set my hand in the presence of two witnesses.

AUGUST GRÜNENWALD.

Witnesses:
  CARL WÖRZ,
  ERNEST ENTENMANN.